C. E. LOMAX
2,663,762
PREENERGIZING CIRCUITS FOR LINE RELAY AND VERTICAL MAGNET OF AUTOMATIC SWITCHES
Original Filed June 24, 1947
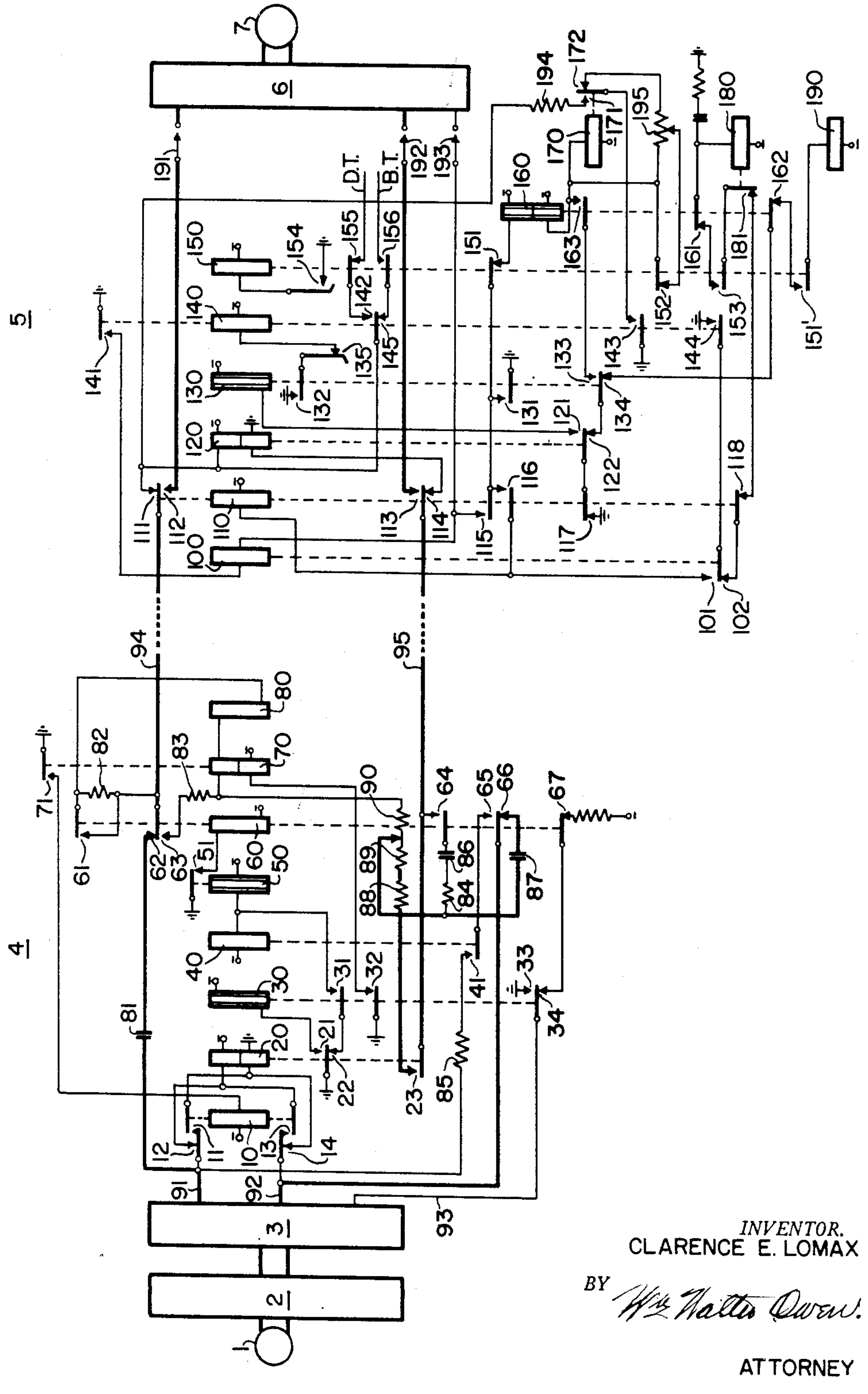
INVENTOR.
CLARENCE E. LOMAX
BY Wm. Walter Owen.
ATTORNEY Patented Dec. 22, 1953

2,663,762

UNITED STATES PATENT OFFICE 2,663,762

PREENERGIZING CIRCUITS FOR LINE RELAY AND VERTICAL MAGNET OF AUTOMATIC SWITCHES

Clarence E. Lomax, Chicago, Ill., assignor to Automatic Electric Laboratories, Inc., Chicago, Ill., a corporation of Delaware Original application June 24, 1947, Serial No. 756,581. Divided and this application September 7, 1950, Serial No. 183,587

4 Claims. (Cl. 179—18)

This invention relates in general to improved and novel pulsing circuits for use in automatic telephone systems and is a division of my prior application filed June 24, 1947, Serial No. 756,581, now U. S. Patent 2,549,696 granted April 17, 1951.

The object of the invention is to provide a novel pulsing circuit for a repeater and for a selector which, when used individually or in combination, will operate more efficiently, more accurately and transmit a series of pulses in which all of the pulses have open periods of equal duration.

A feature of the invention is the manner in which the repeater is arranged to reduce the amount of current to the selector line relay during the period of seizure to effect quick release of the line relay on receipt of the first pulse and to effect delay of the release of the selector line relay on pulses subsequent to the first to cause the line relay to transmit a first pulse and subsequent pulses of a more equal duration.

A feature of the invention is the manner in which a resistance is connected in the repeater outgoing circuit to the selector for the first pulse transmitted thereto, to effect quicker release of the selector line relay on the first pulse only.

Another feature of the invention is the manner in which a condenser and a resistance are connected in series across the outgoing circuit of the repeater to the selector to effect slower release of the selector line relay only on pulses subsequent to the first.

A further feature is the manner in which a pre-energizing circuit is connected to the repeater line relay for a longer period during the subsequent incoming impulses than for the first incoming impulse to cause the open periods of all of the pulses delivered by the line relay to be of equal duration.

Another feature is the manner in which the vertical magnet in the selector is arranged to complete a pre-energizing circuit at times to the line relay and at other times to the vertical magnet and to open the respective pre-energizing circuits at a time prior to the release of the associated magnet or line relay so that the pre-energizing circuits will not cause a delay in the release of same.

An additional feature is the manner in which the vertical off normal relay in the selector circuit is arranged to decrease the strength of the current flow in the pre-energizing circuit to the magnet on pulses subsequent to the first.

The invention both as to its organization and method of operation together with further objects and advantages thereof will best be understood by reference to the following specification and accompanying drawing, Fig. 1.

Referring now to the drawing, the automatic telephone system there illustrated incorporates the features of the applicant's invention as applied to selector and repeater circuits and includes a substation 1, finder switch 2, selector switch 3, one-way repeater circuit 4, transmission lines 94 and 95, incoming selector 5, connector 6, and a second substation 7.

The repeater circuit 4 is connected to the selector 3 by incoming leads 91, 92 and 93 and is controlled to operate by impulses transmitted from substation 1 over the finder 2 and selector switch 3 to incoming lines 91, 92 and 93 in a well known manner to repeat impulses over the transmission lines 94 and 95 to selector 5. Selector 5 is controlled to operate in a well known manner to position wipers 191, 192 and 193 inclusive opposite a desired group of bank contacts which are connected by trunk lines to connectors such as 6, which further extends the call to subscriber 7. Essentially the repeater circuit consists of reverse battery relay 10, line relay 20, hold relay 30, pre-energizing relay 40, pulse control relay 50, slave relay 60 controlled by pulse control relay 50, polarized relay 70, impedance 80, condensers 81, 86 and 87, resistances 82, 83, 84, 85, 88, 89 and 90, the associated relay contacts and their connections.

The battery searching selector circuit 5 consists essentially of well known Strowger vertical and rotary switch having cam springs 135 and off-normal springs 154 used in conjunction with a novel circuit arrangement including testing relay 100, switch through relay 110, line relay 120, hold relay 130, cam relay 140, off-normal relay 150, changeover relay 160, vertical magnet 170, rotary magnet 180, release magnet 190, resistances 194 and 195, the associated relay contacts and connections.

It will now be assumed that the calling subscriber at substation 1 wishes to extend a connection to subscriber 7. On removal of the receiver at the substation 1, a connection is initiated through the finder 2 and selector 3 in a well known manner. Selector 3 searches over wipers 91, 92 and 93 for an idle repeater, such as repeater 4 which has battery potential connected to its test conductor 93.

When repeater 4 is seized, a loop circuit is closed through substation 1, finder 2, selector 3, wipers 91 and 92, contacts 12 and 14 of the repeater to line relay 20. Line relay 20 operates and at its contacts 21 completes an operating circuit to relay 30 and at its contacts 23 completes a loop circuit to line relay 120 in incoming selector 5 over the lines 94 and 95. Relay 30 operates and at its contacts 31 prepares an operating circuit to pre-energizing relay 40 and pulse control relay 50, at its contacts 32 completes an energizing circuit to the lower winding of polarized relay 70 which is ineffective to operate at this time, at its contacts 33 connects ground to test lead 93 to hold the preceding selector switch 3.

The repeater is now prepared to repeat a series of impulses received from substation 1 over incoming conductors 91 and 92.

It should be noted at this time that the talking condensers 81 and 87 are bridged from the incoming leads 91 and 92 to the outgoing lines 94 and 95. Furthermore the outgoing lines 94 and 95 are bridged with the resistance of relay 70, impedance 80 and resistance 82. These conditions coupled with the fact that the line relay 20 is in a fully saturated condition prior to receipt of the first incoming impulse therefore results in a slow release of relay 20 when the open interval of the first impulse is received.

Assuming the receipt of said series of impulses, line relay 20 releases slowly on receipt of the open interval of the first pulse and at its contacts 21 opens the circuit to relay 30 which is slow to release and therefore holds up for the series of impulses, at its contacts 22 closes an operating circuit to relays 40 and 50 and at its contacts 23 opens the outgoing loop circuit which disconnects talking condenser 87 from the positive line conductor 95. However, talking condenser 87 is connected to line 94 through relays 70 and 80 and the resistance 82 and will retard release of the selector line relay 120 somewhat along with condenser 81 which is now connected to the positive line 94. It is apparent that the condensers delayed the release of line relay 20 in the repeater and that the condensers together with the slow operation of line relay 20 tend to delay the release of the selector line relay 120. As an aid in overcoming these retarding effects, resistance 82 is connected in series with relay 70, impedance 80 and the line 94 for the portion of the period that the selector line relay 120 is energized and is awaiting receipt of the first pulse. The reduced amount of current due to resistance 82, relay 70 and impedance 80 in the circuit will effect quicker release of the selector line relay 120 than if the resistance of these elements were not present. This resistance is removed after the first pulse as subsequently described. By this means, selector line relay 120 will have the same amount of current saturation on the shorter closures of the following pulses as it received during the longer closure period of the first pulse.

Relay 40 operates upon closure of contacts 22 and at its contacts 41 prepares a pre-energizing circuit for the line relay 20. Relay 50 operates and at its contacts 51 completes an operating circuit to slave relay 60 which operates and at its contacts 61 by-passes resistance 82 to accomplish the purpose heretofore described, at its contacts 62 and 66 disconnects talking condensers 81 and 87 from the trunk comprising lines 94 and 95, at its contacts 63 inserts resistance 83, which is smaller in value than the combined resistances of relay 70 and impedance 80, in series with the loop to relay 120. In effect resistance 83 by-passes relay 70 and impedance 80 on pulses subsequent to the first. As explained heretofore the resistance value of the relay 70, impedance 80 and resistance 82 reduced the amount of current to the selector line relay 120 and effected quicker release on the first pulse transmitted thereto. Relay 60 at its contacts 64 bridges condenser 86 across the outgoing pulsing circuit to effect delay of the selector line relay 120 release for pulses subsequent to the first, and at its contacts 65 completes a pre-energizing circuit to repeater line relay 20. The repeater line relay pre-energizing circuit extends from the upper winding of the line relay 20 over contacts 12, resistance 85, contacts 41, 65 and 14, and the lower winding of line relay 20. It is apparent from the circuit arrangement that this pre-energizing circuit will be closed to the line relay 20 on pulses subsequent to the first pulse as quickly as relay 40, which responds to the open intervals of the incoming pulses, operates. On the open period of the first pulse, however, this pre-energizing circuit will be closed only after operation of relays 50 and 60. The added time required for operation of these relays on the first pulse results in a shorter period of closure of the pre-energizing circuit to the line relay than on subsequent pulses and consequently the line relay will operate more slowly on the first make after the first break than it will for subsequent make periods of the incoming pulses. The time that the outgoing loop is closed by line relay 20 at its contacts 23, which is normally a shorter period on the first incoming impulses because of the saturation of the line relay, is now compensated for by the delay in application of the pre-energizing circuit to the line relay.

The overall effect is that the duration of the open period of the first impulse to the selector line relay 120 corresponds very closely to the time duration of the open periods of subsequent pulses.

The repeater will repeat the series of incoming impulses over trunks 94 and 95 in a manner similar to that heretofore described. Relay 40 operates with each impulse and relay 50 holds up for the series of impulses corresponding to a digit. The pre-energizing circuit to relay 20 is opened during each make period of the incoming impulses by relay 40 at its contacts 41 to prevent delay of the line relay in its release. The talking condensers 81 and 87 are likewise removed from the trunk circuit during pulsing by relay 60 at its contacts 62 and 66. This is done primarily to eliminate delay in release of the selector line relay 120, but is also effective to prevent inductive kicks of these condensers from effecting false operation of the polarized relay 70. Condenser 86 remains bridged across the outgoing trunk during pulsing. Resistance 83 remains bridged across relay 70 and impedance 80 during pulsing. A short period after termination of an incoming series of impulses representing a digit of a called number, relay 50 releases and at its contacts 51 opens the operating circuit to relay 60. Relay 60 releases and at its contact 61 connects resistance 82 in series with relay 70 and impedance 80 and at its contacts 63 disconnects resistance 83 which was bridged across relay 70 and impedance 80 during pulsing. The purpose of resistance 83 was to keep a small amount of current passing through relay 70 and impedance 80 and in this manner prevent selector line relay 120 from momentarily restoring when relay 60 in the repeater restores on termination of each series of impulses. Resistance 82 is reinserted in the trunk circuit to accomplish quicker release of the selector line relay 120 on the first pulse of further digits received as heretofore described. The repeater operation just described is similar for each digit dialed.

Relay 20 is held operated over the incoming lines 91 and 92 on termination of the incoming impulses and at its contacts 21 maintains the energizing circuit to relay 30, at its contacts 22 opens the operating circuit to relays 40 and 50, and at its contacts 23 prepares a portion of the talking circuit to selector 5. Relay 30 at its contacts 32 maintains the energizing circuit to the lower winding of relay 70 which is ineffective to operate at this time. Relay 40 releases immediately and at its contacts 41 opens the pre-energizing circuit to line relay 20. A short interval later relay 50 releases and at its contacts 51 opens the operating circuit to relay 60. Relay 60 releases and at its contacts 62 and 66 completes a talking circuit through the repeater and condensers 81 and 87 to selector 5, and at its contacts 61 bridges impedance 80, resistance 82, and relay 70 across the talking circuit in series.

When the called party answers, the circuit direction through the upper winding of relay 70 is reversed and the two windings of the relay 70 assist to effect operation of same. Relay 70 operates and at its contacts 71 completes an energizing circuit to relay 10. Relay 10 operates and the connection between the repeater and the incoming lines 91 and 92 are reversed at contacts 11, 12, 13 and 14, thereby effecting a reversal of the current flow in lines 91 and 92 for metering, coin collecting, or supervision purposes depending upon the particular utilization desired.

Release of the circuit is effected in the usual manner when the calling party hangs up. Relay 20 releases and at its contacts 21 opens the operating circuit to relay 30. Relay 30 holds for a brief period. A circuit is completed over contacts 22 and 31 to relays 40 and 50 before relay 30 releases.

Relay 40 operates. Relay 50 operates and at its contacts 51 completes a circuit to relay 60. Relay 60 operates and at its contacts 67 opens a portion of the test lead circuit 93.

After a brief period, relay 30 releases and at its contacts 31 opens the operating circuit to relays 40 and 50, at its contacts 32 opens the operating circuit to the lower winding of relay 70, and at its contacts 34 prepares a point in the test lead circuit 93 to selector 3. Relays 40, 70 and 10 release. Relays 50 and 60 hold for a short interval and then release. Relay 60 at its contacts 67 completes the battery circuit to test lead 93 to give an idle marking to the preceding selector switch 3. In this manner, switches in the distant office are assured of sufficient release time before the trunk is again seized.

Resistances 88, 89 and 90 are part of a variable coil inserted in the trunk circuit to provide means for adjusting the trunk to a fixed pulsing resistance of 1000 ohms as line conditions vary.

In summary, applicant's repeater has been arranged to adjust the trunk to a fixed pulsing resistance value, and to lengthen the duration of the open interval of the first pulse to a value more equal to that of the open periods of subsequent pulses. Also, resistance 82 is connected in series with the trunk to selector 5 to effect quicker release of the selector line relay 120 on the first pulse only and condenser 86 is bridged across the line on subsequent pulses to delay release of the selector line relay 120. The result of these features, in combination with the means for causing the repeater line relay 20 to send a series of pulses having open intervals of more equal duration, is an arrangement whereby the selector switch 5 is operated in a more reliable manner where extreme line conditions are existent. The operation of this selector will now be described.

The battery searching selector 5 is seized and controlled to operate by impulses received over the conductors 94 and 95 from the repeater to position wipers 191, 192, and 193 opposite a desired group of bank contacts in a well known manner.

As heretofore described, a loop circuit is closed to selector line relay 120 when repeater 4 is seized. This loop circuit extends through the upper winding of relay 120, contacts 111, conductor 94, resistance 82, impedance 80, upper winding of relay 70, balancing coil comprising resistances 88, 89, 90, contacts 23, conductor 95, contacts 114, and the lower winding of relay 120. Line relay 120 operates and at its contacts 121 completes an operating circuit to relay 130 over contacts 117 and 121. Relay 130 operates and at its contacts 131 completes an operating circuit to the upper winding of relay 160 and at its contacts 132 completes a circuit to cam relay 140 over cam springs 135. Relay 160 operates and at its contacts 161 opens a point in the operating circuit to rotary magnet 180, at its contacts 162 opens a point in the operating circuit to release magnet 190 and at its contacts 163 closes a point in the operating circuit to vertical magnet 170, and prepares a self-holding circuit. Relay 140 operates and at its contacts 141 prepares a point in the operating circuit to testing relay 100, at its contacts 142 connects dial tone to the line 94, over contacts 111, at its contacts 143 completes a pre-energizing circuit to vertical magnet 170 over contacts 143, 172, a portion of resistance 195 and contacts 152, at its contacts 144 closes a point in the operating circuit to rotary magnet 180 and at its contacts 145 further opens a point in the busy tone circuit.

Pre-energizing of the vertical magnet 170 is a further attempt to alleviate the usual difficulties arising from the fact that the open period of the first pulse to the selector is normally shorter than the open period of subsequent pulses. Although this condition has been greatly improved, by the means utilized in the repeater, pre-energization of the vertical magnet will insure still better operation of the selector especially in cases where leaky line conditions are present on lines 94 and 95. When such conditions are present, the line relay is slow to release and the operating circuit to the vertical magnet is closed for a shorter period of time with the consequent danger of non-operation of the magnet.

By inserting a small portion of the resistance 195 in a pre-energizing circuit to magnet 170 on seizure of the selector, the magnet will effect positive and quicker operation when the operating circuit is completed.

Assuming the receipt of the series of impulses from the repeater over lines 94 and 95, line relay 120 releases on receipt of the open period of the first pulse. The loop circuit to the line relay at this time includes resistance 82 at the selector and the line relay will release more quickly as a result of the limited current flowing in the loop. Relay 120 at its contacts 121 opens the operating circuit to relay 130 and at its contacts 122 completes a circuit to vertical magnet 170 and the lower winding of relay 160 over contacts 117, 122, 133 and 163. Relay 130 is slow to release and remains operated for the series of impulses. Vertical magnet 170 operates and elevates wipers 191 to 193 one step whereby they are positioned in a well known manner opposite the first level of bank contacts on the associated contact field. Vertical magnet 170 at its contacts 171 completes a pre-energizing circuit to line relay 120 as an aid to quicker operation and at its contacts 172 opens the pre-energizing circuit to magnet 170 so as not to retard the magnet in its release. Pre-energizing the line relay 120 is especially helpful in installations which are subject to long dry line conditions where the line relay is normally restored for a maximum period of time and the danger of relay 130 restoring is a contingency.

Incident to this first vertical step, the vertical off normal springs 154 are closed and an operating circuit is completed over said springs to relay 150. Relay 150 operates and at its contacts 151 opens the operating circuit to the upper winding of relay 160, at its contacts 151′ closes a point in the operating circuit to release magnet 190, at its contacts 152 inserts the whole of resistance 195 in the vertical magnet pre-energizing circuit, at its contacts 153 completes a point in the circuit to rotary magnet 180, at its contact 155 disconnects dial tone from the line, and at its contacts 156 prepares a point in the busy tone circuit. Relay 160 is held operated by its lower winding. It will be noted that the insertion of a larger resistance in the pre-energizing circuit after the first pulse is received is effective to reduce the current flow in the circuit and to thereby give the vertical magnet less aid in operating on subsequent pulses than is given to it on the first pulse.

During the open period of the first incoming pulse, condenser 86 in the repeater has been bridged across the conductors in series with a resistance 84. As a result selector line relay 120 will release more slowly on pulses subsequent to the first and further tend to equalize the time interval difference of the open period of the first pulse and the open period of subsequent pulses. Resistance 82 is removed from the loop circuit to the selector line relay during the time the first pulse is being transmitted to the selector as heretofore described.

On receipt of the make period after the first break period, line relay 120 reoperates and at its contacts 122 opens the vertical magnet operating circuit. Vertical magnet 170 releases and at its contacts 171 opens the pre-energizing circuit to line relay 120 to alleviate retardation of the line relay 120 on its release, and at its contacts 172 completes the pre-energizing circuit to the vertical magnet 170 which now includes the full value of resistance 195. In this manner, the vertical magnet elevates the wipers a number of levels relative to the number of impulses received. On cessation of the impulses of the first digit, relays 120 and 130 remain energized. The energizing circuit to relay 160 is opened at contacts 122 and a short interval thereafter relay 160 releases, and at its contacts 161 completes a self-interrupting operating circuit to rotary magnet 180 over contacts 144, 102, 118, 181, 153 and 161, at its contacts 162 closes a point in the release magnet circuit, and at its contacts 163 opens a further point in the operating circuit to vertical magnet 170 and the self-holding circuit for its lower winding. If all trunk lines on the selected level are busy, the switch wipers 191, 192 and 193 will be stepped in a well known manner to the eleventh position, whereupon the cam springs 135 are operated to open the operating circuit to relay 140. Relay 140 releases, and at its contacts 141 opens the testing circuit for relay 100, at its contacts 143 opens the vertical magnet pre-energizing circuit, at its contacts 144 opens the circuit to the rotary magnet 180 to stop the rotary motion of the switch, and at its contacts 145 applies busy tone to the line 94 over contacts 156, 145 and 111. The calling party on receipt of the busy tone restores which opens the operating circuits to relay 120. Relay 120 restores and at its contacts 121 opens the holding circuit to relay 130. Relay 130 releases and at its contacts 134 completes an operating circuit to release magnet 190 over contacts 117, 122, 134, 162 and 151′. Release magnet 190 operates and releases the switch thereby opening the operating circuit to relay 150 at off normal springs 154. Relay 154 restores and the switch is prepared for a subsequent call.

If the selected level is not busy the switch will stop rotating when the wiper 193 finds an idle trunk with battery potential marked thereon. An operating circuit will then be completed for relay 100 over contacts 141. Relay 100 operates and at its contacts 101 completes an operating circuit for relay 110 over contacts 101 and 144, and at its contacts 102 opens the operating circuit to rotary magnet 180 to stop the rotary motion of the switch. Relay 110 operates and at its contacts 111 and 114 opens the operating circuit to line relay 120, at its contacts 112 and 113 connects lines 94 and 95 to lines 191 and 192 respectively, at its contacts 115 and 116 completes a holding circuit to relay 110, at its contacts 117 opens a further point in the operating circuit to release relay 190, and at its contacts 118 opens a further point in the operating circuit to rotary magnet 180.

Relay 120 restores and at its contacts opens the operating circuit to relay 130. Relay 130 releases and at its contacts 132 opens the holding circuit to relay 140. Relay 140 releases and at its contacts 141 opens the operating circuit to test relay 100 and at its contacts 144 opens the operating circuit to relay 110. Relay 100 releases. Relay 110 is held energized for the duration of the connection by ground applied over wiper 193 from succeeding connector switch 6. Off normal relay 150 is held operated over off normal springs 154.

Release of the switch is effected in a normal manner. When the calling party hangs up, ground is removed from conductor 193 and relay 110 releases. Relay 110 at its contacts 117 completes an operating circuit to release magnet 190 over contacts 117, 122, 134, 162 and 151′. Release magnet 190 operates and effects release of the selector switch in a well known manner. Off normal springs 154 thereupon open the circuit to off normal relay 150, which releases and at its contacts 151′ opens the operating circuit to release magnet 190. The release magnet restores and the selector is returned to normal.

The advantages of this selector arrangement are more apparent where adverse line conditions are present. For example if conductors 94 and 95 have long dry line characteristics, line relay 120 tends to remain in the restored condition for a maximum length of time and the danger of release of hold relay 130 is eminent. However, pre-energizing of the line relay 120 reduces the time interval of its restoration thereby effecting longer energization periods to relay 130 and eliminating the danger of its restoration during pulsing. Under circumstances where short leaky line conditions are present and the line relay is energized a maximum amount of the time, the vertical magnet 170 generally will receive a short pulse and the pre-energizing circuit to the line relay in such cases may be a hardship. One manner of preventing the danger of non-operation of the vertical magnet due to short pulses caused by the short leaky line conditions is to pre-energize the magnet as shown in the arrangement. In this manner, the selector arrangement illustrated is operated efficiently over a wider range of line conditions.

While a particular embodiment of the invention has been described, it will be understood that various modifications may be made therein which are within the true spirit and scope of the invention.

What is claimed is:

1. In an automatic switch having incoming connections over which impulses are received, a line relay, means whereby said line relay is operated responsive to said received impulses, an operating magnet, an operating circuit for said magnet, means for controlling said operating circuit, means whereby said last means is operated by each deenergization of said line relay for operating said magnet, a pre-energizing circuit for said line relay, means for controlling said line relay pre-energizing circuit, means whereby said last means is operated by each said magnet energization for completing said line relay pre-energizing circuit, a pre-energizing circuit for said magnet, relay means for completing said pre-energizing circuit for said magnet, means for operating said relay means, and means whereby said last means is controlled by said operation of said magnet.

2. An automatic switch such as claimed in claim 1, wherein said line relay is energized and de-energized responsive to said incoming impulses and wherein said magnet is de-energized under control of said operating circuit responsive to each energization of said line relay, said de-energization of said magnet operating said line relay pre-energizing circuit controlling means to open said line relay pre-energizing circuit, said opening of said line relay pre-energizing circuit thereby preventing a delay in the release of said line relay, said de-energization of said line relay operating said controlling means of said magnet operating circuit for energizing said magnet, means for opening said pre-energizing circuit of said magnet, and means whereby said last means is operated by said energization of said magnet to prevent danger of delay in the release of said magnet.

3. In an automatic switch having incoming connections over which impulses are received, a line relay, means whereby said line relay is first energized on said switch being seized and subsequently de-energized and re-energized for repeating said received impulses, an operating magnet for effecting operations of said switch, a pre-energizing circuit for said magnet, means for controlling said pre-energizing circuit, means whereby said last means is operated by said first energization of said line relay on said switch seizure for completing said magnet pre-energizing circuit to thereby aid in a quicker first energization of said magnet, relay means, means for operating said relay means, means whereby said last means is controlled by a first operation of said magnet, means for reducing the current in said magnet pre-energizing circuit on impulses received subsequent to the first, means for including said last means in said pre-energizing circuit, and means whereby said last means is operated by said operated relay means.

4. In an automatic switch having incoming connections over which impulses are received, a line relay, means whereby said line relay is first energized on said switch being seized and subsequently de-energized during the break period of each received impulse and re-energized during the make period of each received impulse for repeating said received impulses, an operating magnet for effecting operations of said switch, an operating circuit for said magnet, means for controlling said operating circuit, means whereby said last means is operated by each de-energization and energization for respectively energizing and de-energizing said magnet, a pre-energizing circuit for said line relay, means for controlling said pre-energizing circuit of said line relay, means whereby said last means is operated by each magnet energization for completing said line relay pre-energizing circuit before each subsequent energization of said line relay, a pre-energizing circuit for said magnet, means for controlling said pre-energizing circuit of said magnet, and means whereby said last means is operated by each magnet de-energization for completing said pre-energizing circuit to itself prior to its subsequent energization by each de-energization of said line relay.

CLARENCE E. LOMAX.

References Cited in the file of this patent

UNITED STATES PATENTS

| Number | Name | Date |
|---|---|---|
| 2,286,135 | Kater | June 9, 1942 |
| 2,348,198 | Evers et al. | May 9, 1944 |
| 2,438,550 | Burgener | Oct. 7, 1947 |